United States Patent
Bieleń et al.

(10) Patent No.: US 10,770,959 B2
(45) Date of Patent: Sep. 8, 2020

(54) POLE PIECE FOR A TORQUE MOTOR

(71) Applicant: Hamilton Sundstrand Corporation, Charlotte, NC (US)

(72) Inventors: Micha Bieleń, Wrocaw (PL); Jakub Sobol, Wrocaw (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 70 days.

(21) Appl. No.: 16/124,790

(22) Filed: Sep. 7, 2018

(65) Prior Publication Data
US 2019/0081542 A1 Mar. 14, 2019

(30) Foreign Application Priority Data
Sep. 8, 2017 (EP) .................. 17461601

(51) Int. Cl.
| | |
|---|---|
| H02K 26/00 | (2006.01) |
| H02K 15/03 | (2006.01) |
| H02K 15/16 | (2006.01) |
| H02K 1/17 | (2006.01) |
| H02K 1/18 | (2006.01) |
| H02K 1/08 | (2006.01) |
| H02K 15/00 | (2006.01) |
| F15B 13/043 | (2006.01) |

(52) U.S. Cl.
CPC .............. *H02K 26/00* (2013.01); *H02K 1/08* (2013.01); *H02K 1/17* (2013.01); *H02K 1/18* (2013.01); *H02K 15/00* (2013.01); *H02K 15/03* (2013.01); *H02K 15/16* (2013.01); *F15B 13/0436* (2013.01); *H02K 2201/03* (2013.01)

(58) Field of Classification Search
CPC .......... H02K 26/00; H02K 15/00; H02K 1/08
USPC .............. 310/36, 38, 216.097; 335/258, 238
See application file for complete search history.

(56) References Cited

U.S. PATENT DOCUMENTS

| | | | |
|---|---|---|---|
| 3,434,083 A | 3/1969 | Lewis | |
| 4,403,204 A | 9/1983 | Crawshaw et al. | |
| 5,004,940 A | 4/1991 | Vanderlaan | |
| 6,344,702 B1 | 2/2002 | Rodriguez et al. | |
| 8,975,992 B2 * | 3/2015 | Bottcher et al. | H01H 3/28 335/179 |
| 9,953,786 B2 * | 4/2018 | Mecklenburg | H01F 7/1646 |
| 2012/0068095 A1 | 3/2012 | Olson | |
| 2012/0293287 A1 * | 11/2012 | Lauraire | H01H 3/28 335/229 |
| 2016/0125990 A1 * | 5/2016 | Strigerwald | F01L 13/0036 335/229 |

FOREIGN PATENT DOCUMENTS

| | | |
|---|---|---|
| CN | 201443643 U | 4/2010 |
| EP | 0461490 A1 | 12/1991 |
| EP | 1168382 A1 | 1/2002 |

OTHER PUBLICATIONS

Extended European Search Report for International Application No. 17461601.1 dated Feb. 21, 2018, 9 pages.

* cited by examiner

*Primary Examiner* — Naishadh N Desai
(74) *Attorney, Agent, or Firm* — Cantor Colburn LLP

(57) ABSTRACT

There is provided a pole-piece for a torque motor, the pole-piece comprising a first section formed separate from a second section, wherein the first section is held in position with respect to the second section using one or more rigid members.

14 Claims, 6 Drawing Sheets

POLE PIECE FOR A TORQUE MOTOR

FOREIGN PRIORITY

This application claims priority to European Patent Application No. 17461601.1 filed Sep. 8, 2017, the entire contents of which is incorporated herein by reference.

FIELD

The present disclosure relates generally to a pole piece for a torque motor, and more generally to a torque motor incorporating the pole piece and methods of manufacturing a pole piece for a torque motor.

BACKGROUND

Torque motors are known in the art and are configured to produce a torque in order to rotate or move a shaft (e.g., a jet pipe) so as to operate a valve, for example a valve used in a direct drive or pneumatic field, such as an electrohydraulic servo-valve.

An example of a torque motor 10 is shown in FIG. 1A (which is provided for illustrative purposes only), and comprises a lower pole piece 12 and an upper pole piece 14, two sets of coils 16, an armature 18 that is pivotally located within the structure of the torque motor 10. The pivoting armature 18 is connected to a shaft 20, a lower end of which (not shown) is configured to move (e.g., left and right) upon rotation of the armature 18. In use, the movement of the lower end of the shaft 20 (e.g., jet pipe) may be used to operate a valve and/or control fluid flow of various types, and other applications as well.

To ensure high performance of the torque motor 10, the components that are used to create the magnetic field around the armature 18 must be manufactured to a high precision, and such that the clearances between the various magnetic parts (e.g., the lower and upper pole pieces 12, 14, the coils 16 and the armature 18) are as small as possible.

To assemble the torque motor 10, the lower pole piece 12 may be opened or divided into two separate parts 12a, 12b, and an additional part 13, called a magnetic shunt, may be used to connect the separate parts 12a, 12b of the lower pole piece 12 when assembling the torque motor 10.

The geometrical features associated with the connections between the separate parts 12a, 12b of the lower pole piece 12 and the magnetic shunt 13 have to be manufactured with a high precision, but also to allow for the change of the material properties caused by stresses in use. This means, for example, that an interference or press fit may not be used due to potential changes of the material properties; therefore, even with high precision methods that use tight tolerances, there will typically be gaps present between these parts.

In the embodiment of FIG. 1A, a setting shim 11 may be provided in order to connect the various parts of the torque motor 10 to a housing 22. In an alternative background embodiment, as shown in FIG. 1B (also provided for illustrative purposes only), a component 23 may be provided that forms a combined magnetic shunt and setting shim. In this embodiment, the same issues may occur, in that the various components must be manufactured with tight tolerances, but may not be provided with an interference or press fit.

It is desired to provide an improved pole piece for a torque motor.

SUMMARY

In accordance with an aspect of the disclosure, there is provided a pole-piece for a torque motor, the pole-piece comprising a first section and a second section, wherein the first section is held in position with respect to the second section using one or more rigid members.

In accordance with an aspect of the disclosure, there is provided a method of manufacturing a pole-piece for a torque motor, the method comprising: forming a pole-piece from a first section that is separate to and distinct from a second section; and holding the first section in position with respect to the second section using one or more rigid members.

The first section and the second section may be formed separate from each other, such that they may be two separate pieces. In use, the first section may be configured to be brought into abutment or contact with the second section.

The use of rigid members to hold the first section in position with respect to the second section may improve the magnetic characteristics of a pole-piece that is formed from separate sections. Furthermore, the use of rigid members can ease the manufacture and structure of the pole-piece.

The pole-piece may further comprise one or more cavities, holes or apertures for locating the rigid members therein. The one or more rigid members may be located within said one or more cavities, holes or apertures to hold the first section in position with respect to the second section. In other words, when the rigid members are located within the one or more cavities, holes or apertures, the first section may be restricted against movement with respect to the second section.

The one or more cavities, holes or apertures may comprise one or more holes extending from an opening in one of the first section and the second section through to the interior of the other of the first section and the second section. A rigid member may be inserted into each hole and/or may extend through the hole between the first section and the second section.

Each hole may comprise a first hole portion that is located within the first section of the pole piece, and a second hole portion that is located within the second section of the pole piece. When the first section of the pole piece is abutted to the second section of the pole piece, the first hole portion of each hole may align with the second hole portion of that hole to form the hole in the pole-piece. Each hole may extend from the second section of the lower pole piece and into the first section (e.g., an interior thereof) of the lower pole piece when the first section is abutted to the second section.

The one or more cavities, holes or apertures may comprise one or more cavities (e.g., a depression or hollow space) in an outer surface of the pole piece, wherein each cavity may extend from the first section to the second section. A rigid member may be inserted into each cavity and/or may extend between the first section and the second section.

Each cavity may comprise a first cavity portion that is located within the first section of the pole piece, and a second cavity portion that is located within the second section of the pole piece. When the first section of the pole piece is abutted to the second section of the pole piece, the first cavity portion may align with the second cavity portion to form the cavity.

The pole-piece may comprise or consist of a pair of said cavities, holes or apertures, for example a pair of said holes, a pair of said cavities, or a pair comprising one hole and one cavity as described above.

The holes or cavities of each of said pairs may be located on opposed sides of a line bisecting the pole piece.

The holes or cavities of each of said pairs may be located symmetrically on opposed sides of the line bisecting the pole piece.

One or more abutment surfaces of the first section may be configured to abut one or more abutment surfaces of the second section when the first section is held in position with respect to the second section using the one or more rigid members, and the abutment surfaces form one or more lines of abutment in an outer surface of the pole piece, wherein each rigid member may extend through a line of abutment. A longitudinal axis of each rigid member may be at an angle with respect to the line of abutment through which it extends. The angle may be less than 90 degrees, and/or the angle may be between 10-80 degrees, for example between 20-70 degrees, or between 30-60 degrees. The angle may be about 45 degrees.

The one or more rigid members may comprise a pair of pins, although any suitable type of rigid member may be used with any of the aspects and embodiments described herein. The rigid members may be disposed at an angle ($\alpha$) with respect to each other. The angle may be between 30-150 degrees, for example 50-130 degrees, 70-110 degrees or 80-100 degrees. The angle may be about 90 degrees.

The one or more rigid members may be configured to hold the first section in an abutting relationship with the second section, such that one or more abutment surfaces (137) of the first section (132) are configured to abut one or more abutment surfaces (139) of the second section (134) when the first section (132,132') is held in position with respect to the second section (134,134') using the one or more rigid members (150,150').

The method described above may further comprise: providing a single-piece of magnetic material; and cutting the single-piece of magnetic material along one or more lines to form the first section separate from the second section.

BRIEF DESCRIPTION OF THE DRAWINGS

Various embodiments will now be described, by way of example only, and with reference to the accompanying drawings in which.

DETAILED DESCRIPTION

Figure 1A:
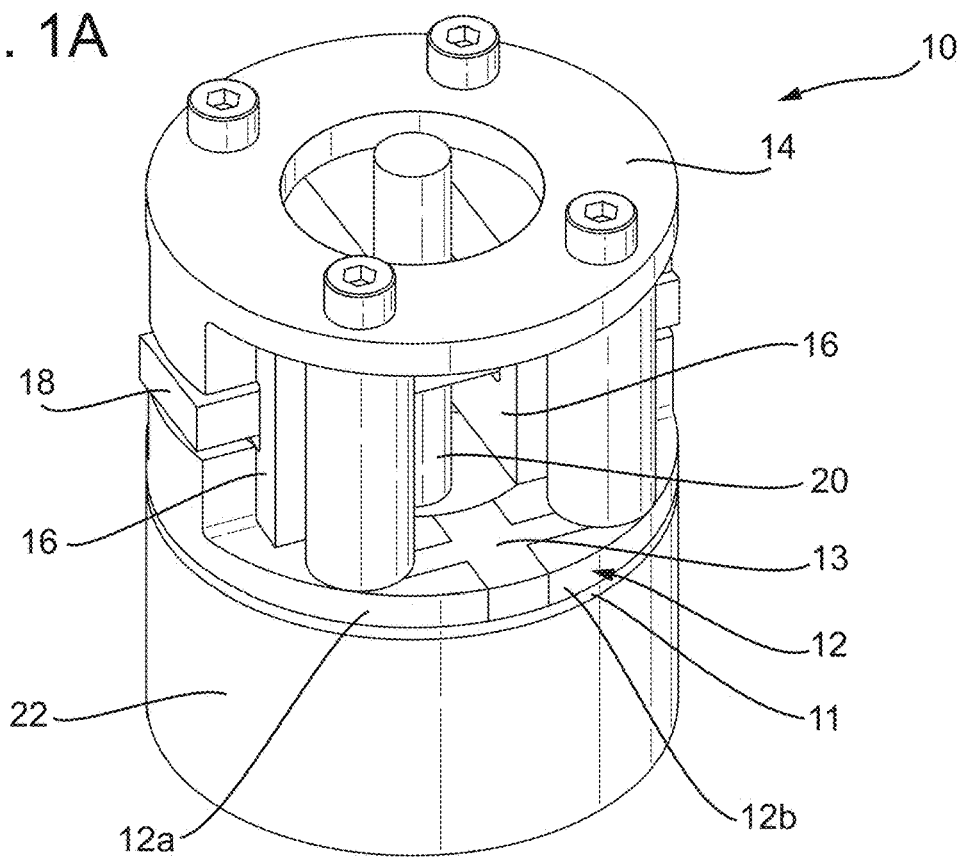
FIGS. 1A and 1B show conventional arrangements of a torque motor and pole piece for illustrative purposes only.
Figure 1B:
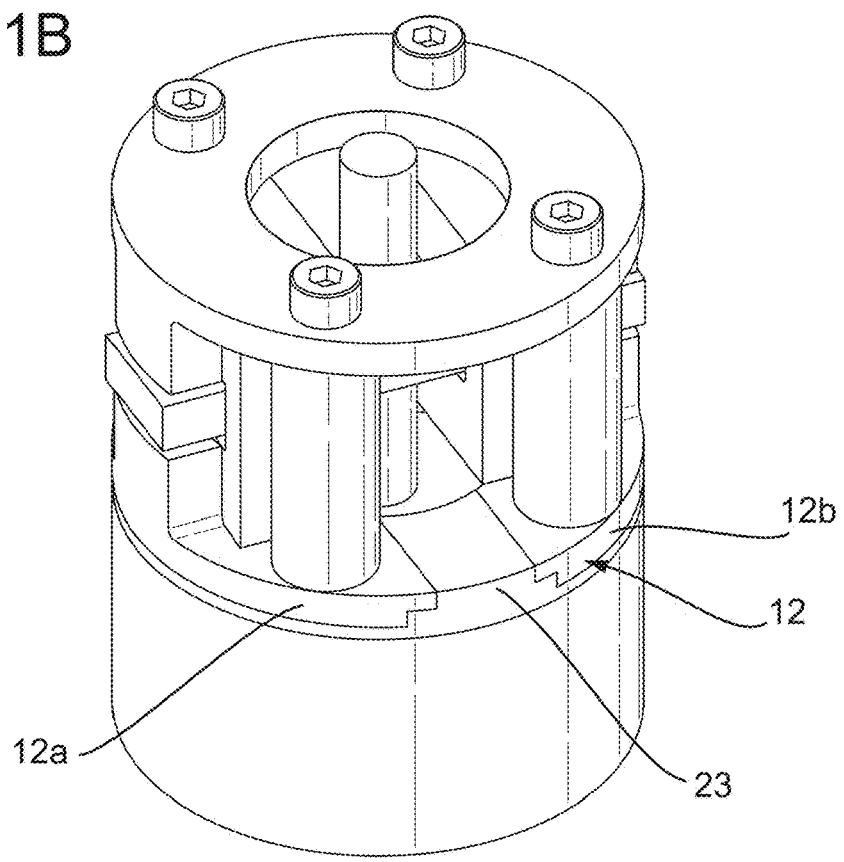
Figure 2A:
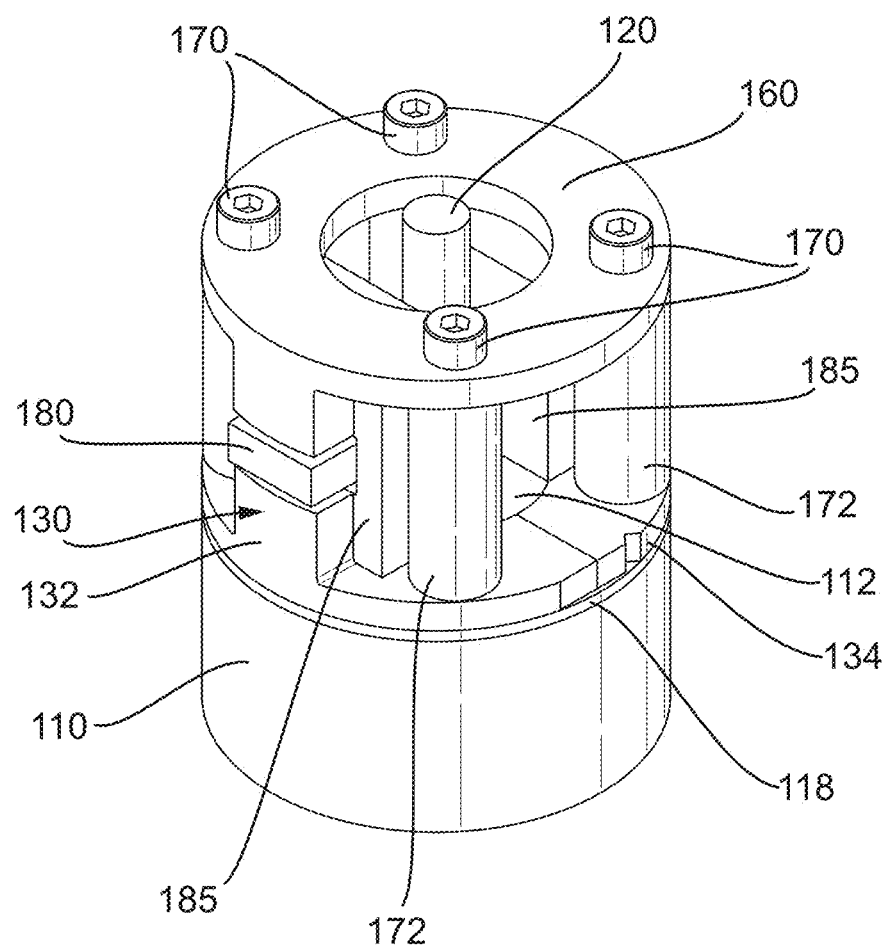
FIGS. 2A and 2B shows an embodiment of a torque motor in accordance with the present disclosure.
Figure 2B:
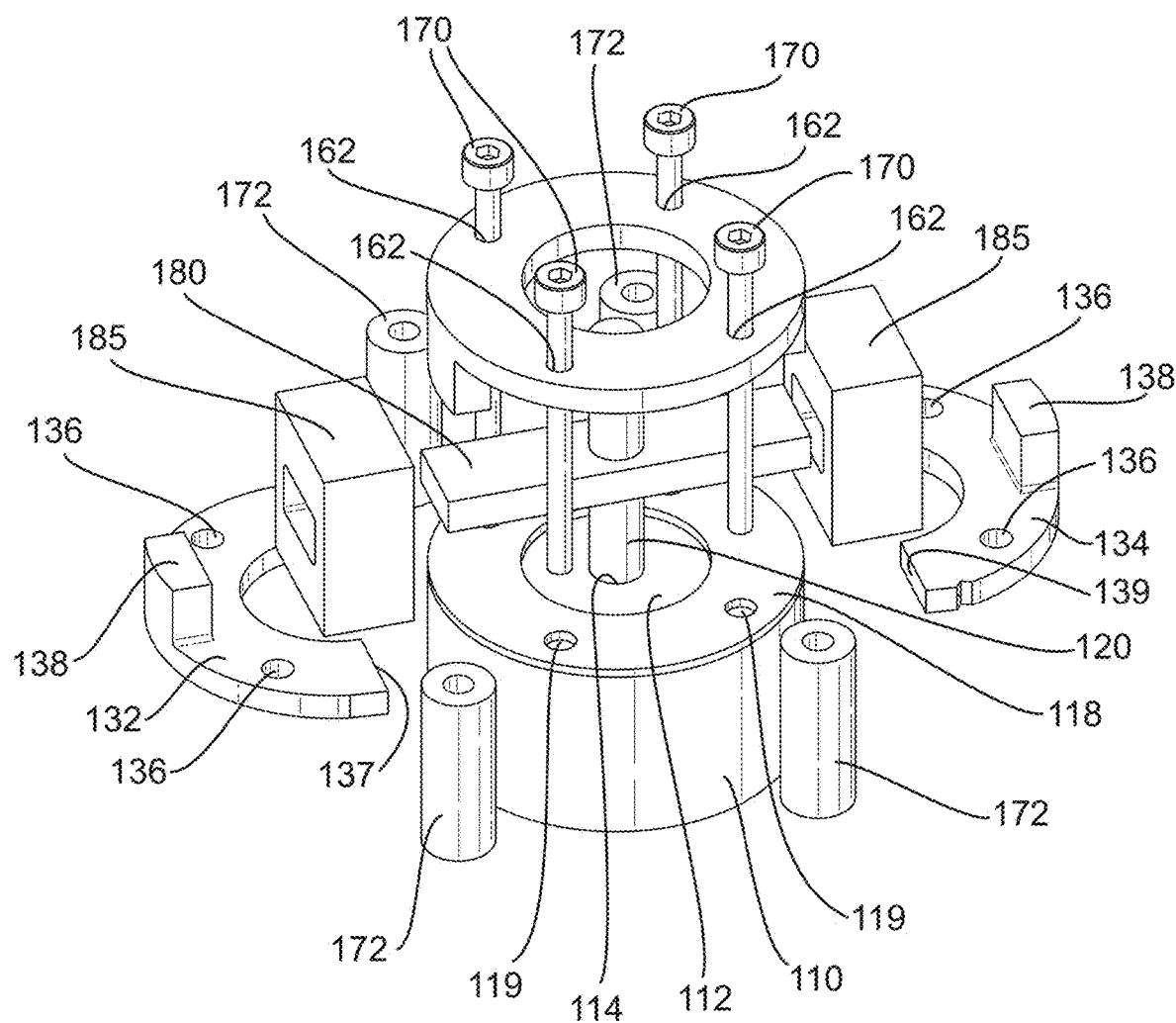

FIGS. 2A and 2B shows an embodiment of a torque motor 100 in accordance with the present disclosure in assembled form (FIG. 2A) and exploded form (FIG. 2B).

The torque motor 100 sits on a housing 110 that may contain various components (not shown) for operating a valve and/or controlling fluid flow of various types, as is known in the art. The housing 110 may comprise an upper surface or platform 112 upon which the various components of the torque motor 100 are placed, which upper surface 112 comprises an aperture 114, through which may extend a shaft 120 of the torque motor 100.

The shaft 120 may form part of, for example, a jet pipe assembly for use in an electrohydraulic servo-valve. The torque motor 100 may also be used in other applications such as a flapper—nozzle structure, a direct drive valve or pneumatic valve, or the like. A detailed description of such applications, e.g., a jet pipe assembly is not provided herein, since a skilled person will have adequate knowledge of the construction and function of such applications.

A shim 118 may be disposed upon the upper surface 112 of the housing 110 and may be used for connecting the various components of the torque motor 100 to the housing 110, and allow easy adjustment thereof. The shim 118 also provides desired operational characteristics and stability of the torque motor 100.

The torque motor 100 comprises a lower pole piece 130 that is split into two separate sections or portions 132 and 134, which will be described in more detail below. The torque motor 100 further comprises an upper pole piece 160 that may be formed as a single piece (e.g., in contrast to the lower pole piece 130). The lower pole piece 130 may form a substantially annular member in use.

The upper pole piece 160 and the lower pole piece 130 may be connected to the housing 110 through the shim 118 via fasteners 170, which are configured to fasten these components to the housing 110. Spacers 172 may be provided, and configured to separate the upper pole piece 160 from the lower pole piece 130 when the fasteners 170 are fastened to the housing 110. The fasteners 170 are configured to extend through a plurality of (e.g., four) apertures 162 in the upper pole piece 160, as well as a plurality of (e.g., four) apertures 136 in the lower pole piece 130, and a plurality of (e.g., four) apertures 119 in the shim 118.

The torque motor 100 comprises an armature 180, which is configured to pivot or rotate in use as is known in the art. The armature 180 is connected to the shaft 120, such that a lower end of the shaft (not shown) may be configured to move (e.g., side-to-side) upon rotation of the armature 180. In use, the movement of the lower end of the shaft 120 may be used to operate a valve and/or control fluid flow of various types, and other applications, as discussed herein.

Surrounding the armature 180 are a pair of electromagnetic coils 185, which may be energized in use to cause the armature 180 to pivot or rotate to actuate the torque motor 100. The coils 185 are disposed so that opposite arm portions of the armature 180 extend through the coils 185. When an electrical signal is applied to the coils 185, the magnetic forces generated cause the armature 180 to pivot or rotate as aforesaid.

Figure 3:
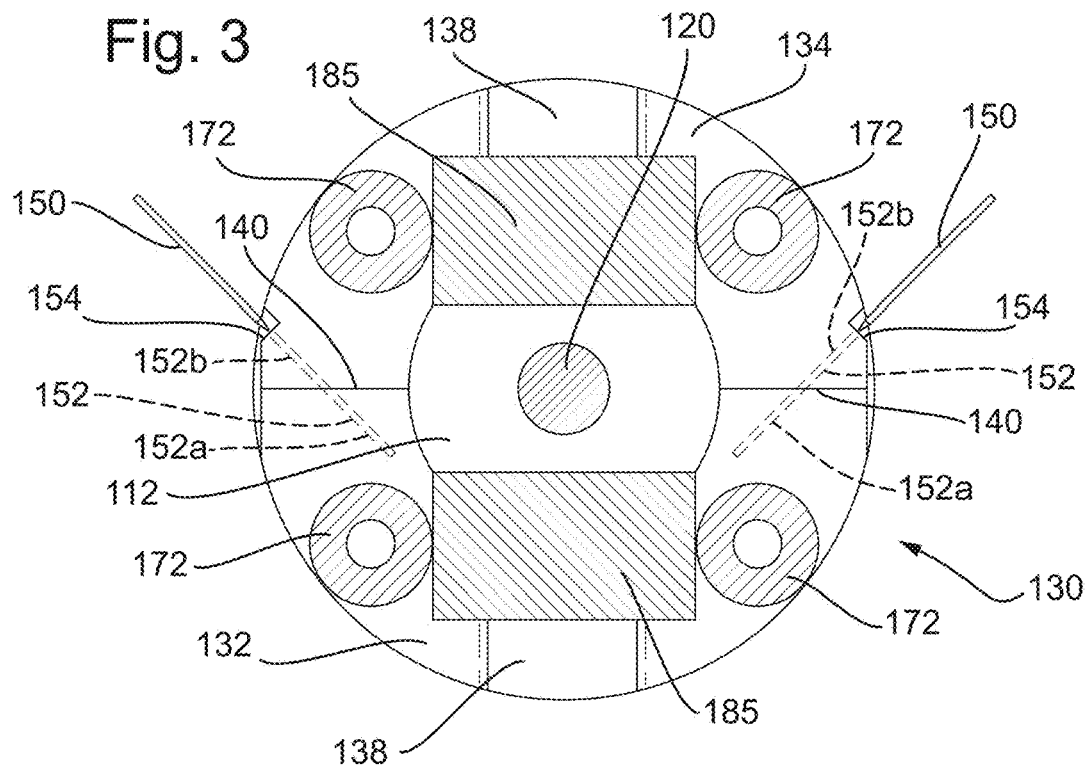
FIG. 3 shows the pole piece of the embodiment of FIG. 2A in situ, and showing the insertion of the rigid members into cavities.
Figure 4:
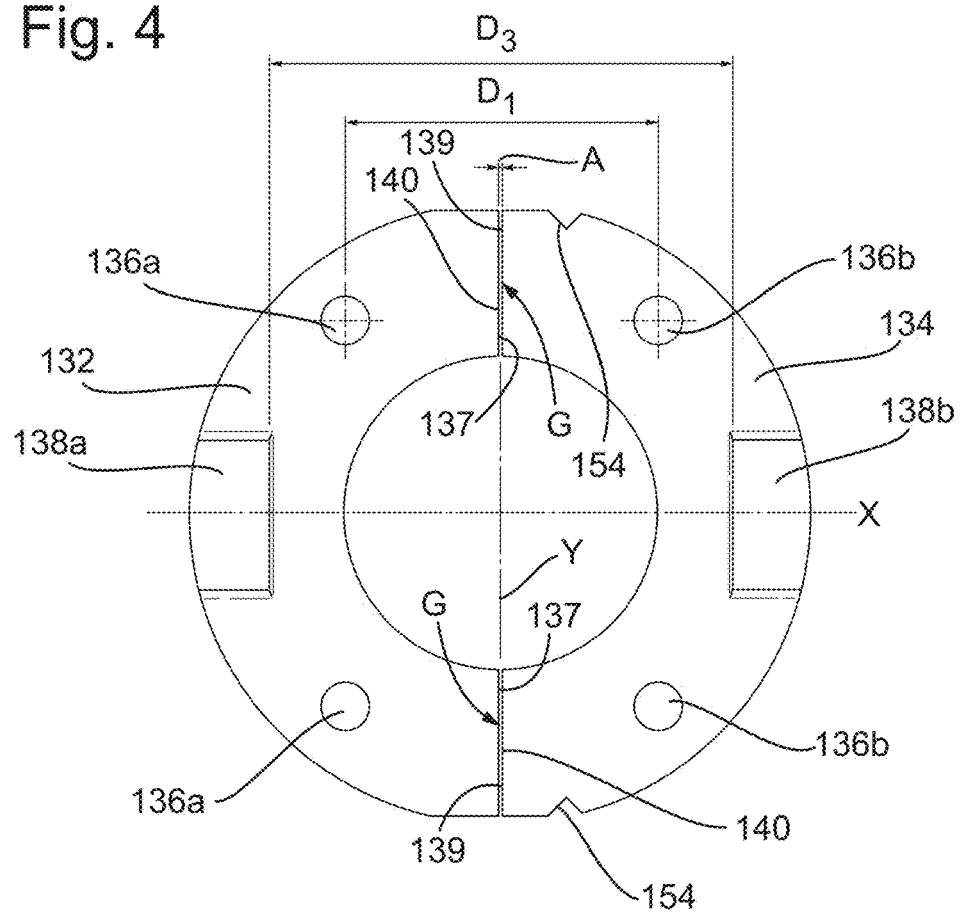
FIG. 4 shows the pole piece of the embodiment of FIG. 2A after being cut and during manufacture of the pole piece.

FIG. 3 shows the lower pole piece 130 as comprising a first portion 132 and a second portion 134 that abut each other, wherein one or more abutment surfaces 137 (e.g., two, as shown in FIG. 4) of the first portion 132 are configured to contact one or more abutment surfaces 139 (e.g., two, as shown in FIG. 4) of the second portion 134, so as to form one or more (e.g., two) lines of abutment 140 (or lines of contact) that extend along an outer surface of the pole-piece 130. The term "abutment" may be used to indicate that, although the first portion 132 and the second portion 134 may touch along their abutment surfaces, they may also be merely adjacent to each other along the line.

In order to prevent relative movement between the first portion 132 and the second portion 134 in use, there is provided one or more (e.g., two) pins 150 that are configured to be inserted into respective holes 152 in the pole-piece 130. Each hole 152 comprises a first hole portion 152a that is located within the first portion 132 of the pole piece 130, and a second hole portion 152*b* that is located within the second portion 134 of the pole piece 130. When the first portion 132 of the pole piece 130 is abutted to the second portion 134 of the pole piece 130 (i.e., as shown in FIG. 3), the first hole portion 152*a* aligns with the second hole portion 152*b* to form the hole 152.

Each hole 152 extends from the second portion 134 of the lower pole piece 130 and into the first portion 132 (e.g., an interior thereof) of the lower pole piece 130 when the first portion 132 is abutted to the second portion 134.

Upon insertion of the pins 150 into the holes 152, substantial relative movement between the two portions 132, 134 may be prevented. The broadest aspects of the present disclosure are not limited to the use of 'pins', but any type of rigid member may be used. By "rigid", it may be meant that the member may be firm, stiff, or incapable of bending (e.g., substantially) without breaking.

Notches 154 may be provided in the circumferential edge of the second portion 134, which notches 154 comprise the entrance to the passages 152, such that each hole 152 extends from an entrance at the notch 154, through the second hole portion 152*b* (which is formed in the interior of the second portion 134) and then through the first hole portion 152*a* (which is formed in the interior of the first portion 132).

The lower pole piece 130 may also comprise raised portions 138 located at opposite ends of the lower pole piece 130, and configured to be located below the axial ends of the armature 180 in use.

FIG. 4 shows the lower pole piece 130 in isolation and comprising the first portion 132 and the second portion 134. In FIG. 3, the lower pole piece 130 is shown immediately after it has been cut from a single piece of material. As is evident, after cutting, the first portion 132 is separated from the second portion 134 by two cutting lines 140. The cutting means that the first portion 132 is separated from the second portion 134 by a gap G, wherein the gap G has a width A corresponding to the width of material removed from the lower pole piece 130 during cutting. The notches 154 may be formed in the second portion 134 prior to or, in some embodiments, after cutting.

The cutting lines 140 may be referred to as lines of abutment 140 once the two portions 132, 134 are brought into contact (e.g., in use), since the lines correspond to the abutment surfaces 137, 139 of the first and second portions 132, 134, respectively. In some embodiments, the two separate portions 132, 134 may not be formed by cutting, but simply manufactured from separate pieces of material.

The second portion 134 may be shifted from the first portion 132 by a distance A that corresponds to the width A of the gap G. The distance A may be the distance that the second section 134 will need to move to contact the first section 132 after the cutting step, and may be calculated or determined prior to cutting.

Figure 5:
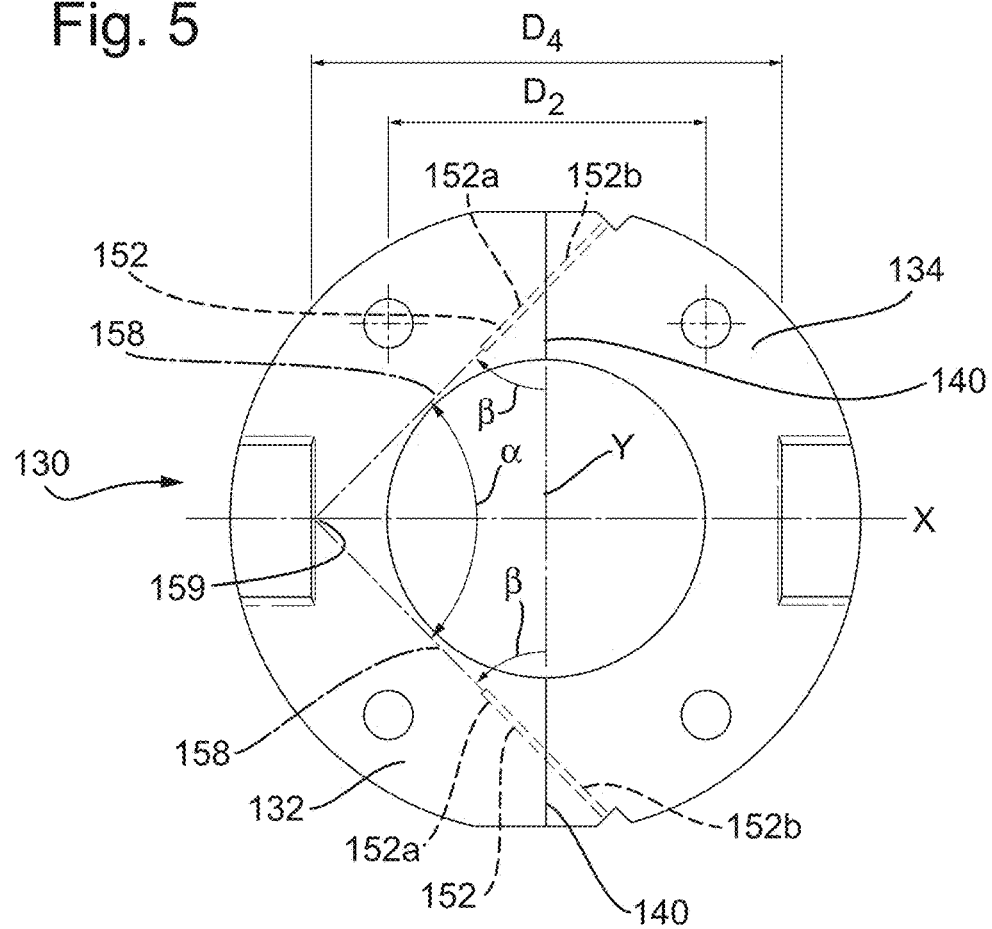
FIG. 5 shows the pole piece of the embodiment of FIG. 2A when the two portions thereof are pushed together.

An XY axis may be defined, as shown in FIGS. 4 and 5, wherein the X direction may correspond to the longitudinal axis of the armature 180 in use, and the Y direction may be perpendicular to the longitudinal axis of the armature 180. The X and Y axes may intersect at a centrepoint 131 of the lower pole piece 130 and may be perpendicular to each other.

Upon moving the second portion 134 into contact with the first portion 132, the second portion 134 shifts by the distance A (e.g., in the X direction). FIG. 5 shows the lower pole piece 130 after this shift.

Before the lower pole piece 130 is cut from the single piece of material, as shown in FIG. 4, the holes 136*b* of the second portion 134 may be located a distance $D_1$ from the holes 136*a* of the first portion 132 (e.g., in the X direction), and the distance $D_1$ may be equal to a first distance $d_1+A$.

Once the second portion 134 has been moved into contact with the first portion 132, as shown in FIG. 5, the holes 136*b* of the second portion 134 may be located a distance $D_2$ from the holes 136*a* of the first portion 132 (e.g., in the X direction), and the distance $D_2$ may be equal to a second distance $d_1$, which is equal to the first distance minus the width A of the gap G.

Before the lower pole piece 130 is cut from the single piece of material, as shown in FIG. 4, the raised portion 138*b* of the second portion 134 may be located a distance $D_3$ from the raised portion 138*a* of the first portion 132 (e.g., in the X direction), and the distance $D_3$ may be equal to a third distance $d_2+A$.

Once the second portion 134 has been moved into contact with the first portion 132, as shown in FIG. 5, the raised portion 138*b* of the second portion 134 may be located a distance $D_4$ from the raised portion 138*a* of the first portion 132 (e.g., in the X direction), and the distance $D_4$ may be equal to a fourth distance $d_2$, which is equal to the third distance minus the width A of the cutting lines 140.

The lines of abutment 140 (and/or cutting lines) may be orientated parallel or perpendicular to the X and Y axes (e.g., the longitudinal axis of the armature 180 in use), as shown in FIGS. 4 and 5. For example, the lines of abutment 140 (and/or cutting lines) may be parallel to one or other of the X and Y axes throughout their entire length.

Although the lines of abutment 140 (and/or cutting lines) are shown as being parallel or perpendicular to the longitudinal axis of the armature 180, various embodiments are contemplated in which the lines of abutment 140 may be slightly different, for example not at a right angle with respect to the X or Y axes, whilst still providing technical effects not achieved by conventional arrangements.

The shape of each line of abutment 140 may be substantially the same on either side of the lower pole piece 130 (e.g., on either side of the X axis). Each line of abutment 140 may, additionally or alternatively, be substantially straight (e.g., when moving or travelling along the line of abutment 140 from one end to the other). The lines of abutment 140 may have translational symmetry with each other.

As discussed above, the lines of abutment 140 (or cutting lines) referred to herewith may correspond to the abutment surfaces 137. 130 of the first and second portions 132, 134, respectively. As such, the shape and/or orientation of the abutment surfaces 137, 139 may correspond (e.g., exactly) to the shape and/or orientation of the lines of abutment 140.

After bringing the first and second portions 132, 134 together, as shown in FIG. 5, the holes 152 may be formed in the lower pole piece 130. The holes 152 may be at an angle β with respect to the X and/or Y axes (and/or the lines of abutment 140), for example at an angle β of between 10 and 80 degrees, and optionally between 30 to 60 degrees with respect to the X and/or Y axes. The holes 152 may be formed using any known method, for example drilling.

The holes 152 may be symmetric about the X axis, such that the longitudinal axes 158 of the holes 152 intersect at a point 159, for example a point 159 along the X axis. The angle α between the longitudinal axes 158 of the holes 152 may be between 30 and 150 degrees, and optionally between 60 and 120 degrees or 80 and 110 degrees. It should be noted that the longitudinal axis 158 of each hole 152 may generally be the same as the longitudinal axis 158 of the pin 150 that is inserted into it.

As described above, pins 150 (see FIG. 3) may be inserted into the holes 152 in order to ensure that any gap between the first portion 132 and the second portion 134 is as small as possible, and remains so during operation of the torque motor 100. The pins 150 may be configured to hold the first and second portions 132, 134 in place during use and/or prevent substantial relative movement between the two components. The pins 150 may be made from any type of material, for example a non-magnetic material, which can reduce magnetic losses in the area of the holes 152. In order to secure the pins 150 in position, they may be adhered (e.g., using glue) or clinched within the notches 154 (e.g., the end of the pin 150 protruding from the hole 152 may be bent or flattened in order to secure the pin 150 in place). Any other suitable mechanism may be used to secure the pins, for example an interference fit or a screw thread.

The lower pole piece 130 may be made by a precise cutting method, for example using electrical discharge machining ("EDM"), waterjet or abrasive cutting (e.g., with an abrasive substance contained within a jet of water) from a single piece of material.

Technical effects of the embodiments disclosed herein include an improved performance of the torque motor by reduction of magnetic losses created by separating the lower pole piece 130 into two portions, for example by using rigid members 150 within holes 152 in order to secure the portions 132, 134 of the lower pole piece 130 in place. It has been found that magnetic shunts are not needed when using the technology of the present disclosure, which reduces the risk of magnetic saturation and further reduces magnetic losses. This also reduces the cost of the lower pole piece 130, since a magnetic shunt is not required to be manufactured. The method of manufacturing a lower pole piece in accordance with the embodiments described above is also repeatable in a reliable manner.

Figure 6:
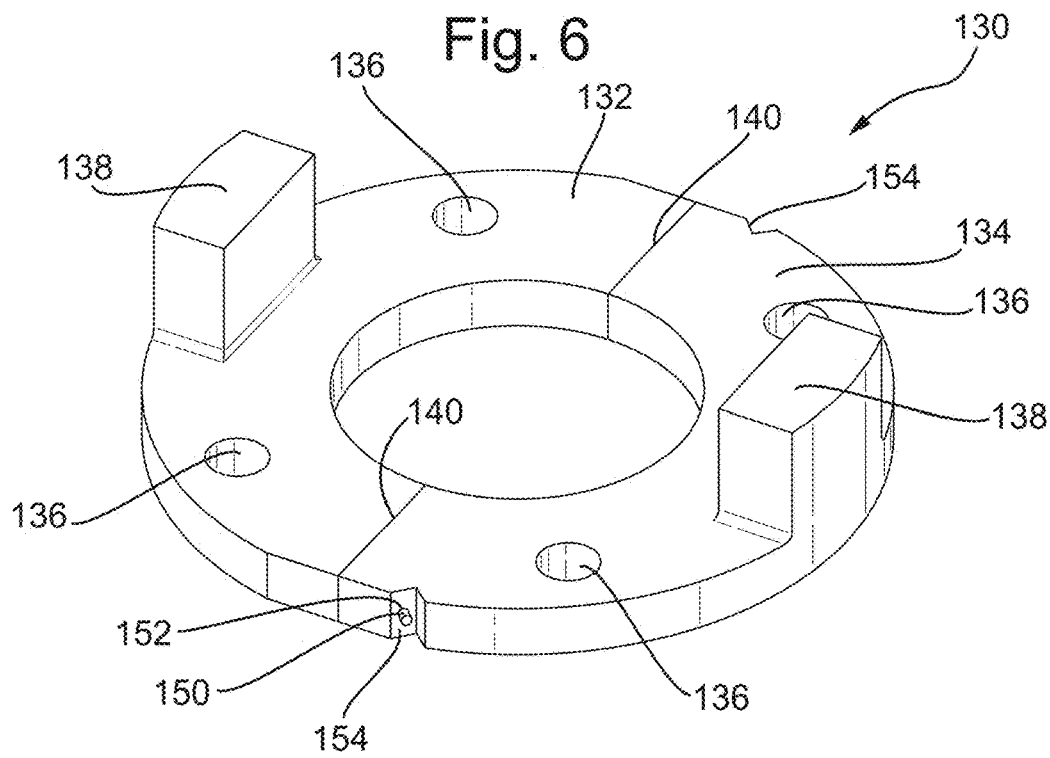
FIG. 6 shows a perspective view of the pole piece of the embodiment of FIG. 2A.

FIG. 6 shows a perspective view of the lower pole piece 130, from which the lines of abutment 140, as well as the notches 154, holes 152 and pins 150 can be seen in detail. As will be appreciated, upon connecting or abutting the first and second portions 132, 134 of the lower pole piece 130 together, the pins 150 may be inserted into the holes 152 in order to secure the first and second portions 132, 134 of the lower pole piece 130 together or to prevent relative movement in an abutting relationship.

Figure 7:
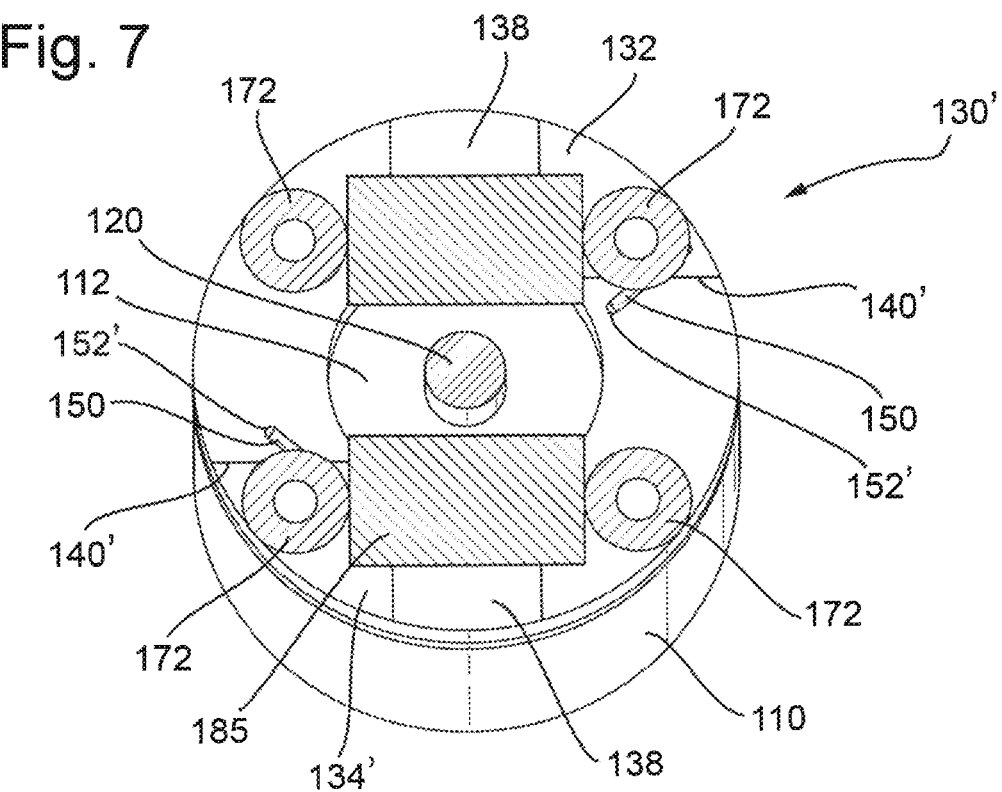
FIG. 7 shows a pole piece according to a further embodiment of the present disclosure.
Figure 8:
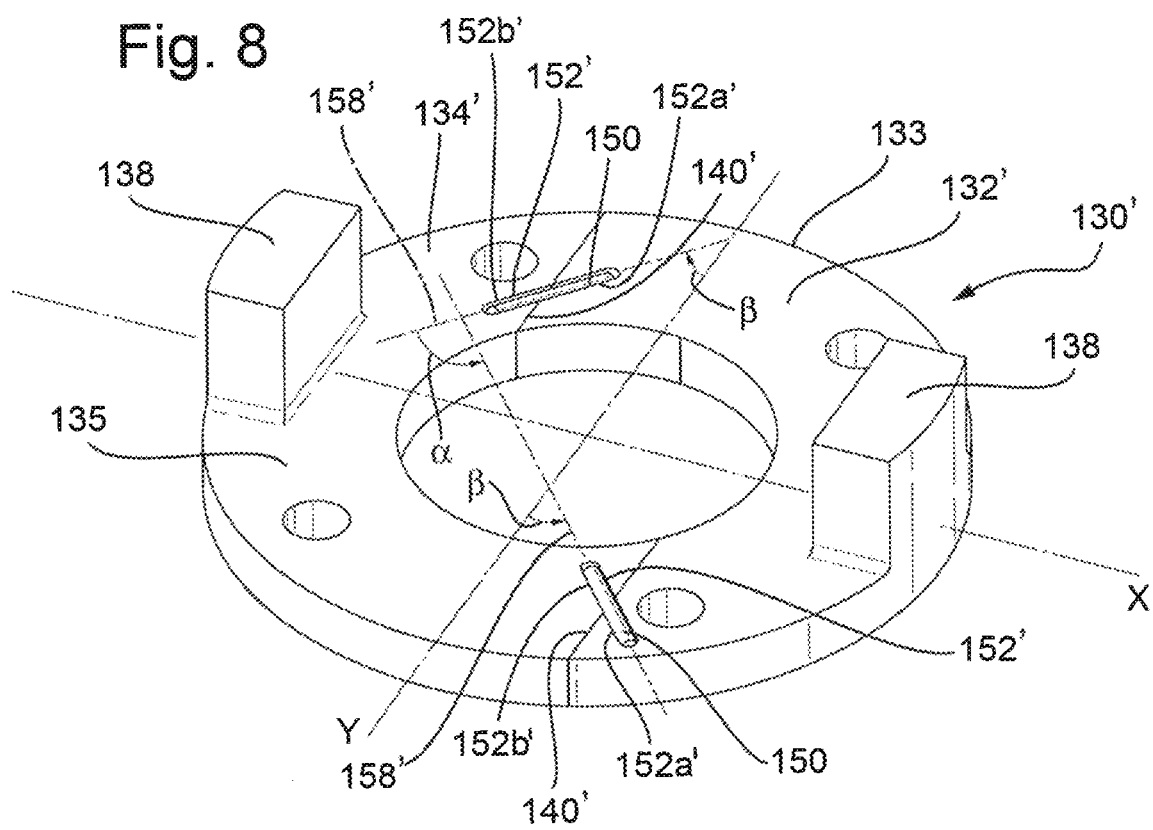
FIG. 8 shows a perspective view of the pole piece of FIG. 7.

FIGS. 7 and 8 illustrate an alternative embodiment of a lower pole piece 130' that may be used in the torque motor 100 described above in place of the lower pole piece 130 illustrated in FIGS. 3 to 6.

In this embodiment, pins 150 are again used to secure the first and second portions 132', 134' of the lower pole piece 130' together. However, instead of forming holes in the lower pole piece as in the embodiments described above, the pins 150 sit within respective cavities 152' that are formed in upper surfaces 133, 135 of the first portion 132' and the second portion 134'.

Each cavity 152' comprises a first cavity portion 152a' that is located within the first portion 132' of the pole piece 130', and a second cavity portion 152b' that is located within the second portion 134' of the pole piece 130'. When the first portion 132' of the pole piece 130' is abutted to the second portion 134' of the pole piece 130' (i.e., as shown in, e.g., FIG. 8), the first cavity portion 152a' aligns with the second cavity portion 152b' to form the cavity 152'.

The lower pole piece 130' may be split into quadrants by the same XY axes as are shown and described in respect of FIGS. 4 and 5, in contrast to the previously described embodiments, the lines of abutment 140' may be located in opposite quadrants of the lower pole piece 130'.

As with the embodiments described above, The cavities 152' may be at an angle with respect to the X and/or Y axes (and/or the lines of abutment 140'), for example at an angle of between 10 and 80 degrees, and optionally between 30 to 60 degrees with respect to the X and/or Y axes. The holes 152' may be formed using any known method, for example drilling. The angle α between the longitudinal axes 158' of the cavities 152' may, in this embodiment, be between 70 and 110 degrees, and optionally between 80 to 100 degrees. It should be noted that the longitudinal axis 158' of each cavity 152' may generally be the same as the longitudinal axis 158 of the pin 150 that sits within it.

In order to prevent the pins 150 from moving out of the cavities 152', the cavities 152' may be positioned underneath the spacers 172 and/or the electromagnetic coils 185, such that the spacers 172 and/or the electromagnetic coils 185 sit on top of the pins 150 when the torque motor 100 is put together, as shown in FIG. 7.

Although the present invention has been described with reference to preferred embodiments, it will be understood by those skilled in the art that various changes in form and detail may be made without departing from the scope of the invention as set forth in the accompanying claims.

The invention claimed is:

1. A pole-piece for a torque motor, the pole-piece comprising:
   a first section; and
   a second section, formed separate from the first section;
   wherein the first section is held in position with respect to the second section using one or more rigid members; and
   wherein one or more abutment surfaces of the first section are configured to abut one or more abutment surfaces of the second section when the first section is held in position with respect to the second section using the one or more rigid members, and the abutment surfaces form one or more lines of abutment in an outer surface of the pole piece, wherein each rigid member extends through a line of abutment.

2. A pole-piece as claimed in claim 1, further comprising:
   one or more cavities in the pole-piece, wherein the one or more rigid members are located within said one or more cavities to hold the first section in position with respect to the second section.

3. A pole-piece as claimed in claim 2, wherein the one or more cavities comprise one or more holes extending from an opening in one of the first section and the second section through to the interior of the other of the first section and the second section, wherein a rigid member is inserted into each hole and extends through the hole between the first section and the second section.

4. A pole-piece as claimed in claim 2, wherein the one or more cavities are formed in an outer surface of the pole piece, each cavity extending from the first section to the second section, wherein a rigid member is inserted into each cavity and extends between the first section and the second section.

5. A pole-piece as claimed in claim 2, wherein the one or more cavities includes a pair of holes, a pair of cavities, or a pair that includes one hole and one cavity.

6. A pole-piece as claimed in claim 5, wherein the cavities of each of said pairs are located on opposed sides of a line (X) bisecting the pole piece.

7. A pole-piece as claimed in claim 6, wherein the cavities of each of said pairs are located symmetrically on opposed sides of the line (X) bisecting the pole piece.

8. A pole-piece as claimed in claim 1, wherein a longitudinal axis of each rigid member is at an angle ($\beta$) with respect to the line of abutment through which it extends.

9. A pole-piece as claimed in claim 8, wherein the angle ($\beta$) is less than 90 degrees, for example between 10-80 degrees.

10. A pole-piece as claimed in claim 1, wherein the one or more rigid members are disposed at an angle ($\alpha$) with respect to each other.

11. A pole-piece as claimed in claim 10, wherein the angle (a) is between 30-150 degrees.

12. A method of manufacturing a pole-piece for a torque motor, the method comprising:

forming a pole-piece from a first section that is separate to and distinct from a second section; and holding the first section in position with respect to the second section using one or more rigid members;

wherein the one or more rigid members are configured to hold the first section in an abutting relationship with the second section, such that one or more abutment surfaces of the first section are configured to abut one or more abutment surfaces of the second section when the first section is held in position with respect to the second section using the one or more rigid members.

13. A method as claimed in claim 12, further comprising:

providing a single-piece of magnetic material; and cutting the single-piece of magnetic material along one or more lines to form the first section separate from the second section.

14. A pole-piece as claimed in claim 1, wherein the one or more rigid members comprises a pair of pins.

* * * * *